United States Patent [19]
Thompson et al.

[11] Patent Number: 6,122,516
[45] Date of Patent: Sep. 19, 2000

[54] ALLOCATING CHANNELS FOR A WIRELESS LINK BETWEEN A CENTRAL TERMINAL AND A SUBSCRIBER TERMINAL OF A WIRELESS TELECOMMUNICATIONS SYSTEM

[75] Inventors: Jonathan A. Thompson, Newbury; Richard M. Lamkin, East Molesey, both of United Kingdom

[73] Assignee: Airspan Networks, Inc., Seattle, Wash.

[21] Appl. No.: 08/962,998

[22] Filed: Oct. 31, 1997

[30] Foreign Application Priority Data

Jun. 11, 1997 [GB] United Kingdom .................. 9712174

[51] Int. Cl.[7] ....................................................... H04Q 7/22
[52] U.S. Cl. ............................................. 455/450; 455/452
[58] Field of Search .................................... 455/450, 452, 455/451, 453, 509

[56] References Cited

U.S. PATENT DOCUMENTS

| | | | |
|---|---|---|---|
| 5,210,752 | 5/1993 | Ito et al. .................................. | 455/455 |
| 5,278,835 | 1/1994 | Ito et al. .................................. | 455/452 |
| 5,396,496 | 3/1995 | Ito et al. .................................. | 455/450 |
| 5,428,668 | 6/1995 | Dent et al. ............................... | 455/452 |
| 5,680,398 | 10/1997 | Robinson ................................. | 455/509 |
| 5,752,193 | 5/1998 | Sholefield et al. ...................... | 455/452 |
| 5,778,319 | 7/1998 | Sawaki ..................................... | 455/452 |

FOREIGN PATENT DOCUMENTS

| | | | |
|---|---|---|---|
| 0307962 | 3/1989 | European Pat. Off. .......... | H04B 7/24 |
| 0488173 | 6/1992 | European Pat. Off. .......... | H04Q 7/04 |
| 2174571 | 11/1986 | United Kingdom ............. | H04Q 7/04 |
| 2287381 | 9/1995 | United Kingdom ............. | H04Q 7/38 |
| 9301666 | 1/1993 | WIPO ............................... | H04J 3/16 |
| 9601543 | 1/1996 | WIPO ............................... | H04Q 7/20 |

*Primary Examiner*—Daniel S. Hunter
*Assistant Examiner*—Myron K. Wyche
*Attorney, Agent, or Firm*—Baker Botts L.L.P.

[57] ABSTRACT

The present invention provides a wireless telecommunications system comprising an interface mechanism for allocating a radio slot for a wireless link between a central terminal and a subscriber terminal within said wireless telecommunications system. At least one frequency channel is provided to support wireless links between the central terminal and the subscriber terminal, and a frequency channel is arranged to provide a plurality of radio slots. The interface mechanism comprises a radio manager, responsive to an indiction that a call is to be established, for issuing an allocation request message to a radio slave within the central terminal requesting that radio slave to allocate a radio slot for the call. Further, a radio slave, associated with a frequency channel, is provided to be responsive to receipt of the allocation request message from the radio manager, to reference a record identifying available radio slots within the frequency channel in order to select, if available, a radio slot within that frequency channel for allocation to the call, and to issue a response message to the radio manager indicating that a radio slot has been selected.

35 Claims, 9 Drawing Sheets

ALLOCATING CHANNELS FOR A WIRELESS LINK BETWEEN A CENTRAL TERMINAL AND A SUBSCRIBER TERMINAL OF A WIRELESS TELECOMMUNICATIONS SYSTEM

TECHNICAL FIELD OF THE INVENTION

The present invention relates generally to wireless telecommunications systems, and more particularly to techniques for allocating channels for a wireless link between a central terminal and a subscriber terminal of a wireless telecommunications system.

BACKGROUND OF THE INVENTION

A wireless telecommunications system has been proposed in which a geographical area is divided into cells, each cell having one or more central terminals (CTs) for communicating over wireless links with a number of subscriber terminals (STs) in the cell. These wireless links are established over predetermined frequency channels, a frequency channel typically consisting of one frequency for uplink signals from a subscriber terminal to the central terminal, and another frequency for downlink signals from the central terminal to the subscriber terminal.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

The central terminal is typically connected to a telephone network and exists to relay messages from subscriber terminals in the cell controlled by the central terminal to the telephone network, and vice versa. By this approach, an item of telecommunications equipment connected to a subscriber terminal may make an outgoing call to the telephone network, and may receive incoming calls from the telephone network.

Due to bandwidth constraints, it is not practical for each individual subscriber terminal to have its own dedicated frequency channel for communicating with a central terminal. Hence, techniques have been developed to enable data items relating to different wireless links (i.e. different ST-CT communications) to be transmitted simultaneously on the same frequency channel without interfering with each other. One such technique involves the use of a "Code Division Multiple Access" (CDMA) technique whereby a set of orthogonal codes may be applied to the data to be transmitted on a particular frequency channel, data items relating to different wireless links being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by that orthogonal channel on that particular frequency channel, the orthogonal channel always being available and dedicated to that particular ST.

However, as the number of users of telecommunications networks increases, so there is an ever increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available. These orthogonal channels are then assigned to particular STs on demand as needed. This approach means that far more STs can be supported by a single central terminal than is possible in a fixed assignment mode, the exact number supported depending on the level of dial tone service that the service provider desires.

In such a Demand Assignment system, it is clear that when a wireless link is to be established between a particular subscriber terminal and the central terminal, then the actual radio slot assigned for that wireless link will depend on the current usage of other radio slots in the wireless telecommunications system, and so the actual radio slot assigned to a particular subscriber terminal for each subsequent call is likely to vary on a call-by-call basis. For the purposes of the present application, the term "radio slot" refers to the bandwidth elements into which each frequency channel is sub-divided, these radio slots being assigned to particular calls as required. Hence, for the above-discussed CDMA technique, the radio slots may be the orthogonal channels provided within the frequency channel, or alternatively may be a predetermined portion of an orthogonal channel, assuming techniques are employed to enable data items pertaining to more than one wireless link to be transmitted within a single orthogonal channel of a particular frequency channel.

UK patent application no. 9626566.5 describes one such technique whereby selected orthogonal channels may be subdivided to form additional orthogonal channels. Further, UK patent application no. 9626567.3 describes an alternative approach in which selected orthogonal channels may be sub-divided in the time dimension by employing TDM techniques.

Given that, in a Demand Assignment system as discussed above, the actual radio slot assigned for a wireless link between a particular subscriber terminal and the central terminal may vary on a call-by-call basis, it is clear that there is a need to provide a technique for efficiently managing the allocation of radio slots to calls as required.

SUMMARY OF THE INVENTION

Viewed from a first aspect, the present invention provides a wireless telecommunications system comprising an interface mechanism for allocating a radio slot for a wireless link between a central terminal and a subscriber terminal within said wireless telecommunications system, at least one frequency channel being provided to support wireless links between the central terminal and the subscriber terminal, and a frequency channel being arranged to provide a plurality of radio slots, the interface mechanism comprising: a radio manager, responsive to an indiction that a call is to be established, for issuing an allocation request message to a radio slave within the central terminal requesting that radio slave to allocate a radio slot for the call; and a radio slave, associated with a frequency channel, arranged to be responsive to receipt of the allocation request message from the radio manager, to reference a record identifying available radio slots within the frequency channel in order to select, if available, a radio slot within that frequency channel for allocation to the call, and to issue a response message to the radio manager indicating that a radio slot has been selected.

In accordance with the present invention, a radio slave associated with a particular frequency channel can be arranged to allocate radio slots within that frequency channel as requested by a radio manager provided to manage the allocation process.

It has been found that this technique provides a particularly efficient way of managing the allocation of radio slots for wireless links between a central terminal and a subscriber terminal of a wireless telecommunications system, in situations where the radio slot used for the wireless link may vary from call to call. One situation where this occurs is in the above-described Demand Assignment system, but it will be appreciated by those skilled in the art that the present invention is not only applicable to Demand Assignment systems, but to any systems in which communications between a central terminal and a subscriber terminal, and vice versa, may occur on different radio slots.

In preferred embodiments, a radio slave is provided for each frequency channel arranged to support wireless links between the central terminal and the subscriber terminal. In such embodiments, the radio manager is preferably arranged to respond to an indication that the radio slave addressed by the allocation request message does not have a radio slot available for the call, to re-issue the allocation request message to another of said radio slaves.

By this approach, even if the radio slots on one frequency channel, eg the 'home' frequency channel for a particular subscriber terminal, are not available for the call, free slots on another frequency channel can be found and allocated to the call.

Preferably, the indication that a call is to be established is generated by a call manager arranged to receive an incoming call destined for said subscriber terminal. The radio manager is, in such instances, preferably arranged to notify the call manager when a radio slot has been allocated.

If more than one radio slot is to be used for communications with the subscriber terminal, then in preferred embodiments, the allocation request message identifies the number of radio slots required, and the radio slave is arranged to select, if available, that number of radio slots and to issue a response message to the radio manager indicating that the required number of radio slots have been selected. In the preferred embodiments, the radio manager has access to information about the subscriber terminal, in particular the bandwidth supported by that subscriber terminal, and hence can include that information within the allocation request message. Typically, the radio slave will be asked to allocate enough radio slots to cover the full bandwidth supported by the ST, even if the current call does not require that full bandwidth, since, by this approach, a subsequent call directed to the same subscriber terminal can readily be allocated bandwidth whilst the present call is still in progress.

In preferred embodiments, the radio manager comprises a transaction state machine allocated by the radio manager to send the allocation request message to the radio slave, and to receive the response message from the radio slave. By this approach, the radio manager can handle a number of calls simultaneously, since a separate transaction state machine can be allocated for each call.

In preferred embodiments, upon receipt of the response message, the radio manager is arranged to cause an invitation message to be transmitted to the subscriber terminal inviting the subscriber terminal to acquire the wireless link on the selected radio slot. Preferably, the radio manager is arranged to instruct the radio slave to cause the invitation message to be transmitted to the subscriber terminal.

In one preferred implementation, a call control channel is provided within the frequency channel, and a radio port manager is associated with the call control channel. The radio manager can then be arranged to instruct that radio port manager via the radio slave to transmit the invitation message to the subscriber terminal over the call control channel.

In preferred embodiments, when a subscriber terminal is not in use, it is arranged to listen on the call control channel for any transmissions that may be directed to that subscriber terminal. By this approach, management messages can be communicated to the subscriber terminal, and further, in accordance with the preferred embodiments of the present invention, the subscriber terminal can receive the invitation message inviting it to acquire the wireless link on a particular radio slot.

Further, in preferred embodiments, each radio slot has a radio port manager associated therewith, and, for incoming calls to the subscriber terminal, the radio manager is arranged to instruct the radio slave to cause the invitation message to be transmitted by all radio port managers capable of communicating with the subscriber terminal. The radio slave is preferably arranged to notify the radio manager when all radio port managers have been instructed to send the invitation message.

It is possible that an incoming call may be destined for a subscriber terminal which is already handling a call between a connected item of telecommunications equipment and the central terminal. In such a case, that subscriber terminal will not be listening to the call control channel, and would otherwise not receive the invitation message. However, since the subscriber terminal may be supporting more than one item of telecommunications equipment, and the new incoming call may be destined for a different item of telecommunications equipment than that already involved in a call, then it is important that the invitation message is passed to the subscriber terminal so that the new incoming call may be established.

Preferably, the radio manager comprises a transaction state machine allocated by the radio manager to cause the invitation message to be transmitted to the subscriber terminal via the radio slave, and to receive any confirmation signals from the radio slave. A radio slave is typically provided for each frequency channel and, if more than one frequency channel may be used to communicate with the subscriber terminal, the transaction state machine is arranged to instruct each radio slave in turn to cause the invitation message to be transmitted to the subscriber terminal.

In preferred embodiments, a radio port slave is provided within the subscriber terminal for receiving the invitation message, and for issuing an acquisition request message to a radio port manager within the central terminal associated with the selected radio slot, the radio port manager being responsive to receiving the acquisition request message to grant the subscriber terminal access to the radio slot.

Said radio slave, upon selecting a radio slot, is preferably arranged to inform the radio port manager within the central terminal associated with that selected radio slot to cause that radio port manager to configure the central terminal to receive the acquisition request message on that selected radio slot.

In preferred embodiments, the radio port manager is arranged to determine a transmission rate required by the subscriber terminal for said wireless link, and, upon receipt of the acquisition request message from the radio port slave, to issue a rate switch message to the radio port slave if the radio port slave is not using the required transmission rate; the radio port slave being responsive to the rate switch message to configure the subscriber terminal to use the required transmission rate and to re-issue the acquisition request message to the radio port manager.

By this approach, the radio port manager within the central terminal is able to control the transmission rate used for both the uplink and downlink communication paths, the radio port slave being responsive to the receipt of rate switch messages to cause the subscriber terminal to be configured to use the transmission rate indicated in the rate switch message, and then to re-issue the acquisition request message to the radio port manager. When the correct transmission rates are being used, the radio port manager will then grant the subscriber terminal access to the radio slot.

In preferred embodiments, the radio slave is arranged to cause a list to be broadcast on a call control channel provided within the frequency channel, the list identifying available radio slots that may be used to establish an outgoing call from the subscriber terminal, the subscriber terminal, upon selecting one of these available radio slots, being arranged to issue an acquisition request message to a radio port manager within the central terminal associated with the selected radio slot.

Hence, the subscriber terminal can be provided with a list identifying all of the currently available radio slots that may be used for an outgoing call.

The radio slave is preferably arranged to inform those radio port managers associated with the available radio slots identified in the list, to cause those radio port managers to enter an available state in which they can receive an acquisition request message.

In preferred embodiments, the radio port manager associated with the radio slot selected by the subscriber terminal is arranged to notify the radio slave of the acquisition of that radio slot upon receipt of the acquisition request message from the radio port slave.

This ensures that the radio slave is kept up-to-date of the radio slots that have been acquired from the broadcast free list, so that any subsequent list broadcast on the call control channel can be updated appropriately to ensure that it is up-to-date at the time it is transmitted.

Viewed from a second aspect, the present invention provides a radio manager for allocating a radio slot for a wireless link between a central terminal and a subscriber terminal within said wireless telecommunications system, at least one frequency channel being provided to support wireless links between the central terminal and the subscriber terminal, and a frequency channel being arranged to provide a plurality of radio slots, the radio manager being configured to be operable to receive an indiction that a call is to be established, to issue an allocation request message to a radio slave within the central terminal requesting that radio slave to allocate a radio slot for the call, and to receive a response message from the radio slave indicating that a radio slot has been selected.

Viewed from a third aspect, the present invention provides a radio slave for allocating a radio slot for a wireless link between a central terminal and a subscriber terminal within said wireless telecommunications system, the radio slave being associated with a frequency channel provided to support wireless links between the central terminal and the subscriber terminal, and the frequency channel being arranged to provide a plurality of radio slots, the radio slave being configured to be operable to receive an allocation request message requesting the radio slave to allocate a radio slot for a call, to reference a record identifying available radio slots within the frequency channel in order to select, if available, a radio slot for allocation to the call, and to issue a response message indicating that a radio slot has been selected.

Viewed from a fourth aspect, the present invention provides a method of allocating a radio slot for a wireless link between a central terminal and a subscriber terminal of a wireless telecommunications system, at least one frequency channel being provided to support wireless links between the central terminal and the subscriber terminal, and a frequency channel being arranged to provide a plurality of radio slots, the method comprising the steps of: employing a radio manager to respond to an indiction that a call is to be established by issuing an allocation request message to a radio slave within the central terminal requesting that radio slave to allocate a radio slot for the call; employing a radio slave, associated with a frequency channel, to respond to receipt of the allocation request message from the radio manager by referencing a record identifying available radio slots within the frequency channel in order to select, if available, a radio slot within that frequency channel for allocation to the call; and issuing a response message to the radio manager indicating that a radio slot has been selected.

BRIEF DESCRIPTION OF THE DRAWINGS

The present invention will be described further, by way of example only, with reference to a preferred embodiment thereof as illustrated in the accompanying drawings, in which.

DETAILED DESCRIPTION OF THE INVENTION

Before describing a preferred embodiment of the present invention, an example of a wireless telecommunications system in which the present invention may be employed will first be discussed with reference to FIGS. 1 to 4.

Figure 1:
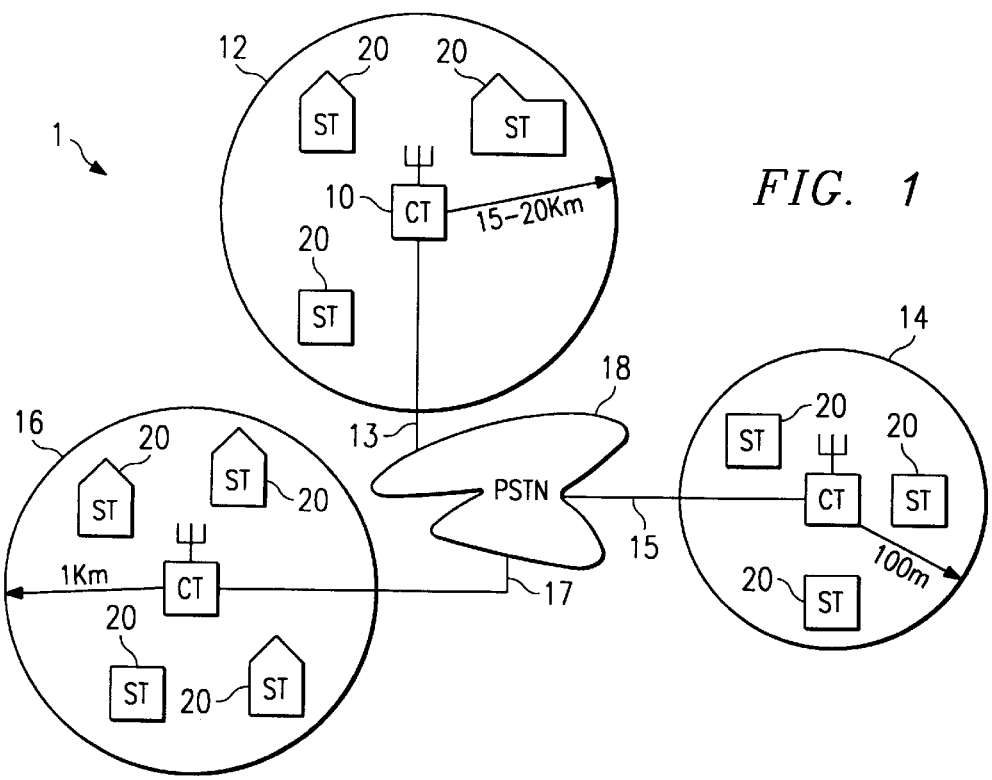
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc., and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing radio links between subscriber terminals 20 at fixed locations within a service area (e.g., 12, 14, 16) and the central terminal 10 for that service area. In preferred embodiments, each subscriber terminal 20 is provided with a demand-based access to its central terminal 10, so that the number of subscribers which can be serviced exceeds the number of available wireless links.

Figure 2:
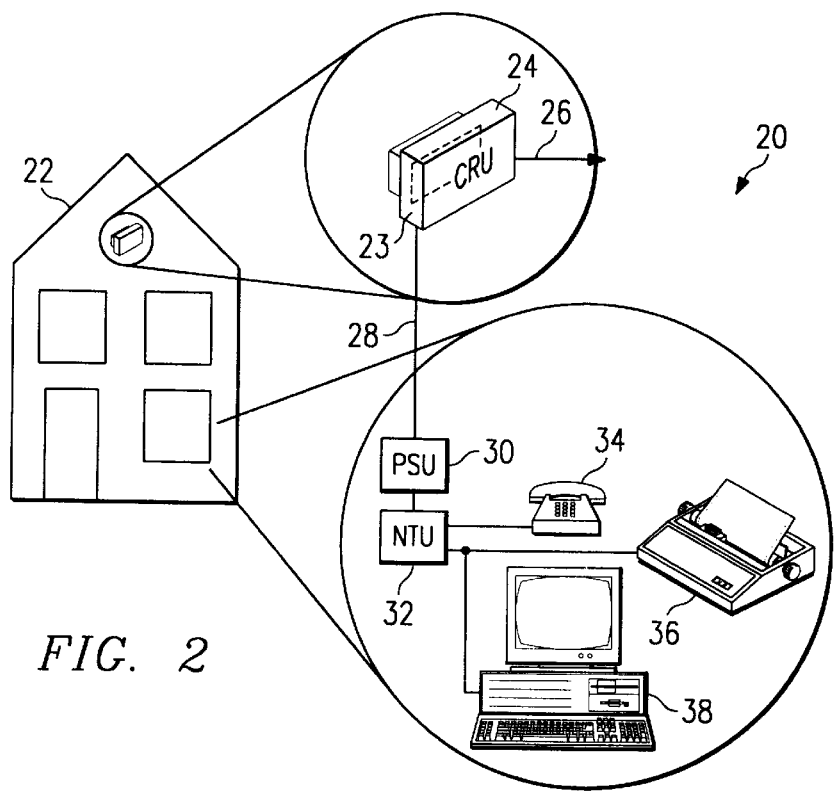
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
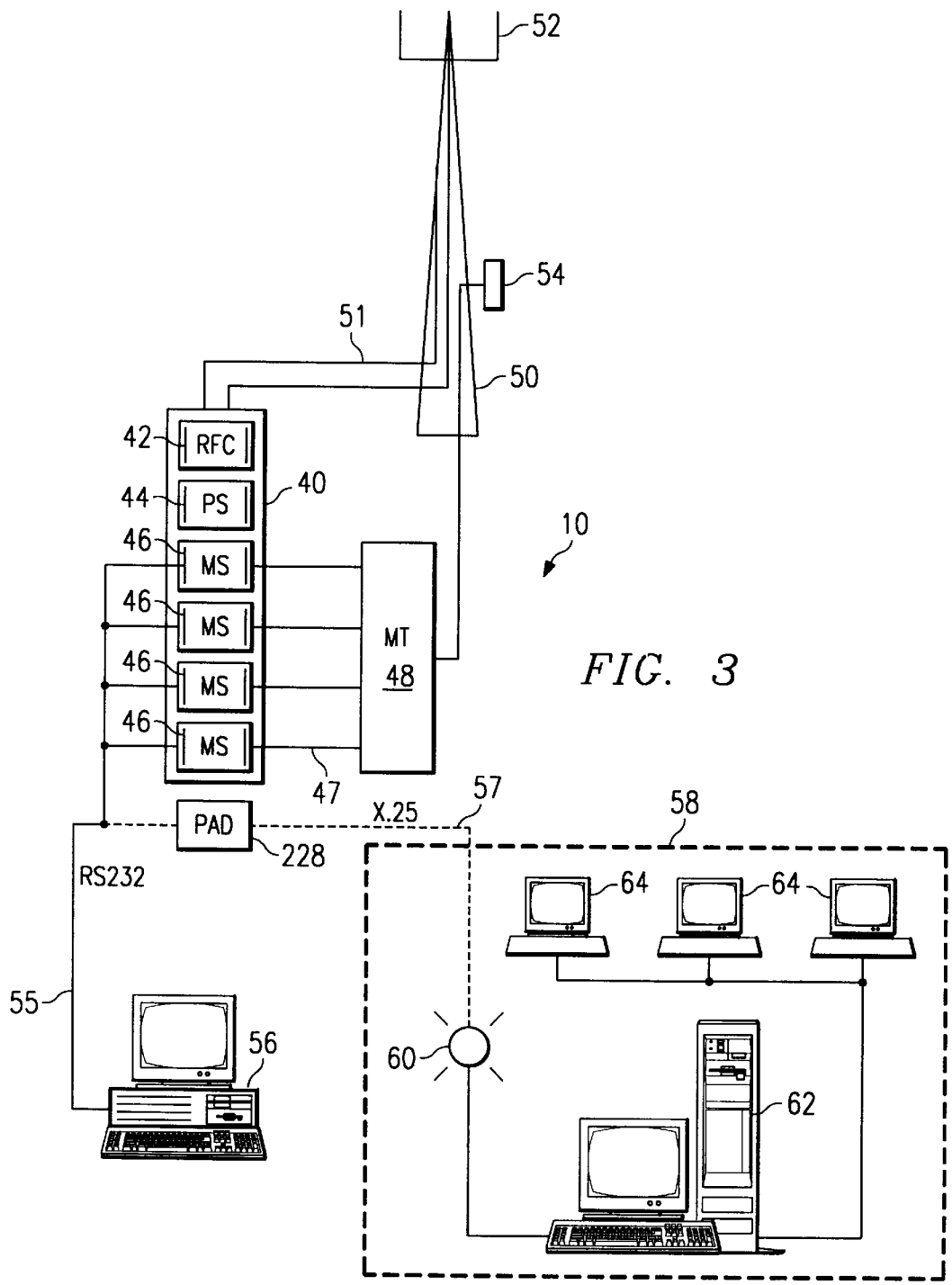
FIG. 3 is a schematic illustration of an example of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

Figure 3A:
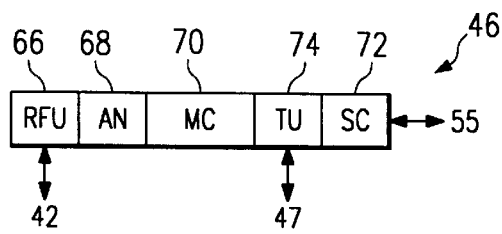
FIG. 3A is a schematic illustration of a modem shelf of a central terminal of the telecommunications system of FIG. 1.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 18) modem cards 70. The modem cards perform the baseband signal processing of the transmit and receive signals to/from the subscriber terminals 20. This may include ½ rate convolution coding and x 16 spreading with "Code Division Multiplexed Access" (CDMA) codes on the transmit signals, and synchronisation recovery, de-spreading and error correction on the receive signals. Each modem card 70 in the present example has two modems, and in preferred embodiments there are eight modem cards per shelf, and so sixteen modems per shelf. However, in order to incorporate redundancy so that a modem may be substituted in a subscriber link when a fault occurs, only 15 modems on a single modem shelf 46 are generally used. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to the subscriber terminals via one of 15 of the 16 modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

Figure 4:
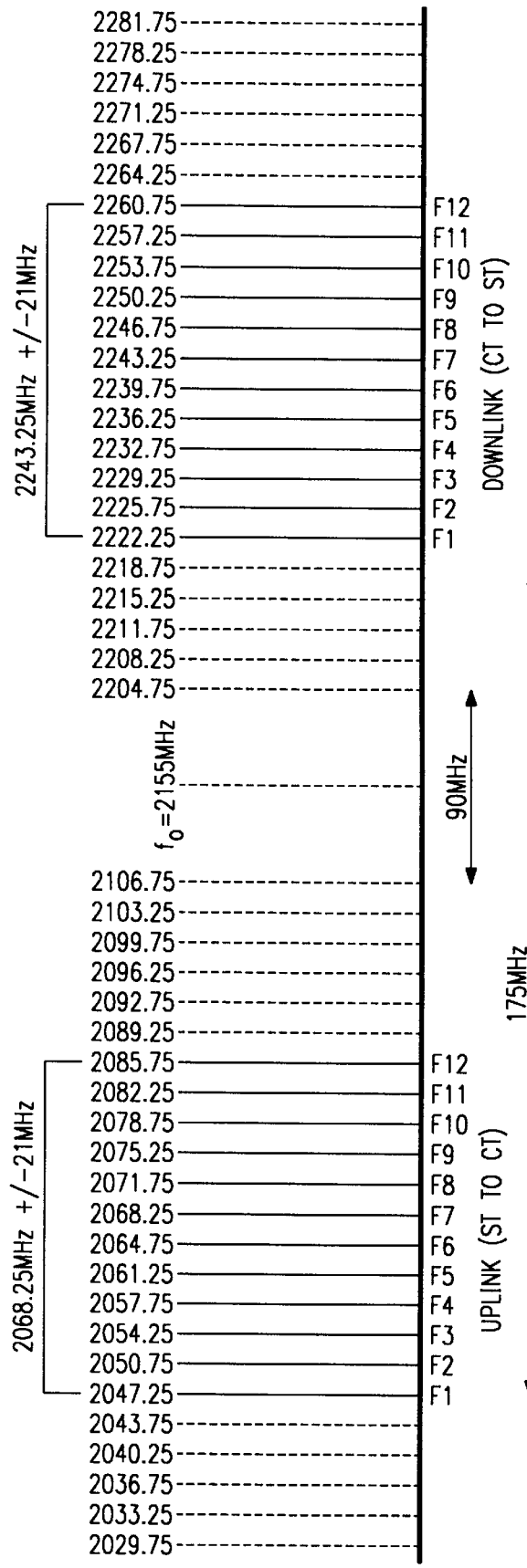
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F-701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

The above description has provided an overview of a suitable wireless telecommunications system in which the present invention may be employed. The techniques used in preferred embodiments of the present invention to establish wireless links between a central terminal and a subscriber terminal will now be discussed.

Figure 5:
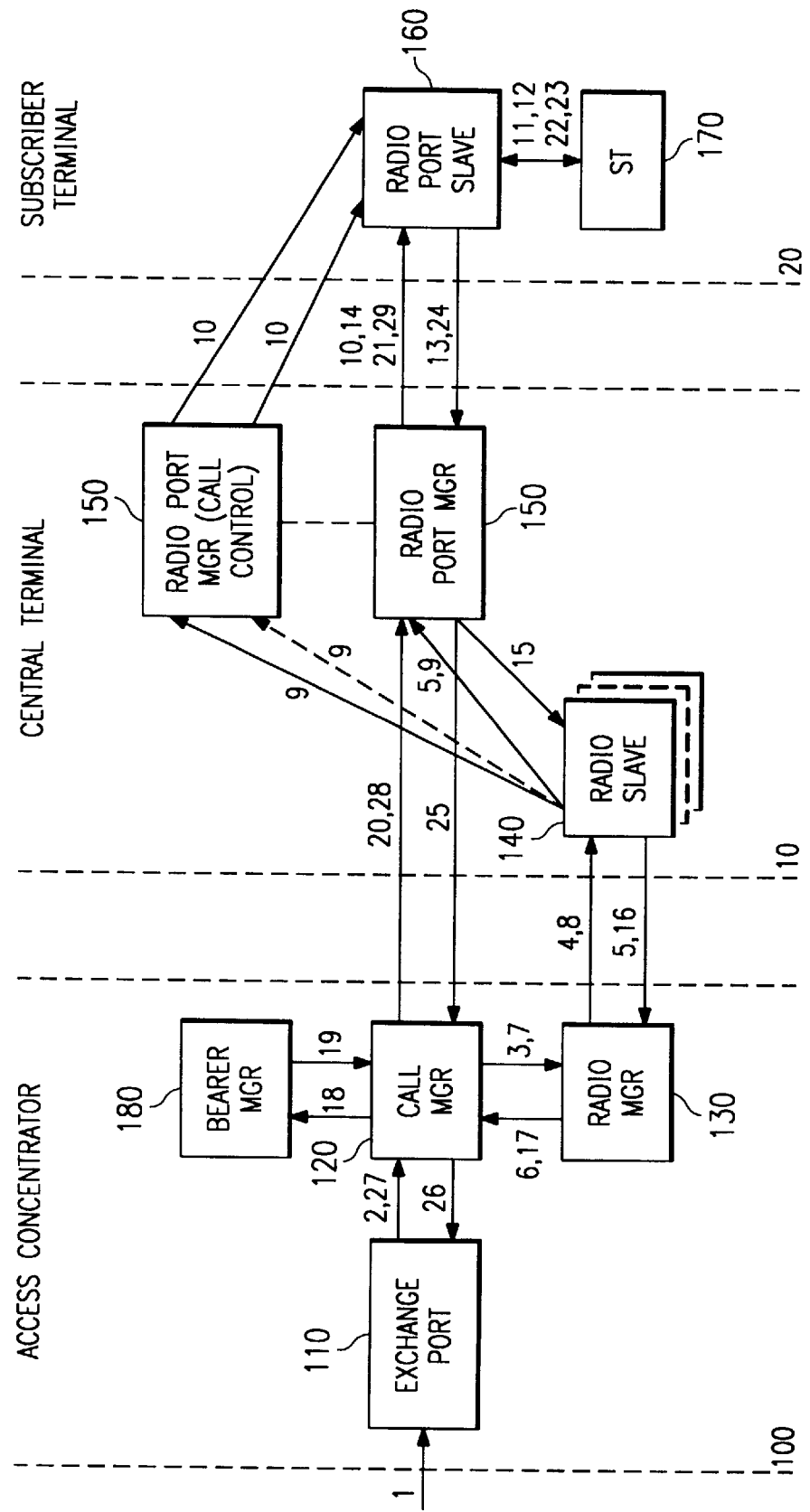
FIG. 5 is a block diagram illustrating the main elements employed in preferred embodiments of the present invention to handle an incoming call to a subscriber terminal.

FIG. 5 is a block diagram illustrating the main elements involved within the wireless telecommunications system to route calls between a telephone exchange switch and a subscriber terminal. As discussed earlier, in a Demand Assignment mode of operation, far more STs can be supported than there are traffic bearing channels to handle wireless links with those STs, the exact number supported depending on the level of dial tone service that the service provider desires.

However, the use of a Demand Assignment mode complicates the interface between the central terminal and the switch of a public switched telephone network (PSTN). On the switch side interface, the CT must provide services to the switch as though all of the subscribers are connected with direct service even though they may not be actually acquired to a radio frequency channel. Regardless of whether the ST is acquired or not to the switch, all of the subscribers must have a presence at the interface to the switch. Without some form of concentration, it is clear that a large number of interfaces to the switch would need to be provided. However, most PSTN switches still use unconcentrated interfaces, for example V5.1 or CAS, and only relatively few use concentrated interfaces, such as TR303 or V5.2.

To avoid each central terminal having to provide such a large number of interfaces to the switch, it is proposed to use an access concentrator 100, which transmits signals to, and receives signals from, the central terminal using concentrated interfaces, but maintains an unconcentrated interface to the switch, protocol conversion and mapping functions being employed within the access concentrator 100 to convert signals from a concentrated format to an unconcentrated format, and vice versa.

It will be appreciated by those skilled in the art that, although the access concentrator 100 is illustrated in FIG. 5 as a separate unit to the central terminal 10, and indeed this is the preferred implementation, it is also possible that the functions of the access concentrator could be provided within the central terminal 10 in situations where that was deemed appropriate.

FIG. 5 illustrates the sequence of events invoked to route an incoming call from the switch to the subscriber terminal. The communications between the various elements illustrated in FIG. 5 are indicated by the arrows in the Figure, and the numbers adjacent to the arrows indicate when those communications take place in relation to the other communications illustrated in the Figure.

The first step is that an incoming call is received by the exchange port 110 of the access concentrator, and the call manager 120 is then notified of the call. In preferred embodiments, the exchange port 110 includes the functional elements required to perform conversion between the unconcentrated and the concentrated format, and vice versa.

The call manager 120 then sends a message to the radio manager 130, requesting the radio manager 130 to identify a radio slot to be used to carry the call. In the central terminal 10, a number of radio slaves 140 are provided, in preferred embodiments there being one radio slave 140 for each modem shelf, and hence each frequency channel, provided by the central terminal. The radio manager 130 identifies a radio slot by asking each of the radio slaves 140 in the shelves capable of carrying a call to the addressed subscriber terminal for a radio slot. Each radio slave 140 is asked in turn, until a suitable radio slot is found, the addressed radio slave 140 sending a message to the radio manager 130 informing the radio manager 130 of a suitable radio slot that may be used for the call if such a radio slot exists within the frequency channel managed by that radio slave.

In preferred embodiments, each frequency channel is subjected to CDMA techniques, in preferred embodiments this providing sixteen orthogonal channels within each frequency channel. Further, techniques such as those described in the earlier mentioned patent applications nos. 9626566.5 and 9626567.3 are used to sub-divide the orthogonal channels to enable data items relating to a plurality of different wireless links to be transmitted within a particular orthogonal channel. Hence, if an orthogonal channel has a bandwidth of 160 Kbit/s, then in preferred embodiments each orthogonal channel is sub-divided to provide four radio slots of 40 Kbit/s each.

When the radio manager 130 contacts each radio slave 140 to determine whether that radio slave can provide a radio slot for the call, the radio manager also indicates the bandwidth required for the call. Hence, depending on the bandwidth required, the radio slave may need to determine whether it can provide more than one radio slot for use in carrying that call, in such cases these plural radio slots preferably being radio slots from within the same orthogonal channel, and being contiguous with one another. In preferred embodiments, the radio manager determines the bandwidth required based on information about the ST addressed by the call. Hence, if the ST is able to support a bandwidth of 160 kbit/s, then even if the current call does not require that bandwidth, the radio manager 130 still requests a radio slave to allocate that bandwidth. By doing this, a subsequent call directed to the same ST can readily be allocated bandwidth whilst the present call is still in progress.

When the radio slave 140 indicates to the radio manager 130 that it does have the required radio slot, or radio slots, available for the call, and identifies those radio slots to the radio manager 130, the radio slave 140 also contacts the radio port manager associated with the selected radio slot. In preferred embodiments, there is one radio port manager 150 provided for each radio slot. Hence, if more than one radio slot is to be allocated for a particular call, then in preferred embodiments, the 'primary' radio port manager responsible for the first of those slots will be notified, and the other radio port managers responsible for the other allocated radio slots will be slaved to the primary radio port manager 150.

Prior to receipt of this message from the radio slave, the radio port manager 150 will have been in an "idle" state. However, upon receipt of the message from the radio slave 140, the radio port manager 150 is arranged to configure itself such that it is able to receive an acquisition request message from a subscriber terminal on its associated radio slot, the radio port manager 150 then entering an "allocated" mode in which it waits for receipt of the acquisition request message.

Once the radio manager 130 has received from the radio slave 140 the identification of the radio slot to be used to carry the call, it informs the call manager 120 that a radio slot has been determined. The call manager 120 then instructs the radio manager 130 to invite the addressed subscriber terminal to acquire the wireless link on the selected radio slot. The radio manager 130 then informs all of the radio slaves 140 associated with frequency channels that may be used to contact the subscriber terminal, and these radio slaves are arranged to instruct all of the radio port managers 150 associated with the radio slots of those frequency channels to cause those radio port managers to transmit an invitation message to the subscriber terminal 20.

One of the orthogonal channels within each frequency channel is preferably designated as a call control channel, and hence one of the radio port managers 150 will be associated with that call control channel. In preferred embodiments, since there are actually four radio slots within an orthogonal channel, then there will actually be four radio port managers associated with the call control channel. However, one of these radio port managers will be chosen as the 'primary' radio port manager, and the other radio port managers will be slaved to that 'primary' radio port manager.

When a subscriber terminal is not involved in a call on a particular traffic channel, it is preferably arranged to listen to the call control channel, this enabling management messages to be sent to the subscriber terminal, and also, in accordance with preferred embodiments of the present invention, enabling the subscriber terminal to receive information about incoming calls destined for that subscriber terminal.

Hence, generally speaking, the transmission of the invitation message on the call control channel by the associated radio port manager 150 will be sufficient to inform the addressed subscriber terminal 20 of the radio slot that it should acquire in order to establish a wireless link between the central terminal and the subscriber terminal for an incoming call. However, in some cases, the addressed subscriber terminal will already be involved in a call on another traffic channel (or indeed in a communication with the CT for management purposes, such as the download of software), and hence will no longer be listening to the call control channel. Nevertheless, since more than one item of telecommunications equipment can be supported by an individual subscriber terminal, it is still possible that this incoming call can be connected, despite one item of telecommunications equipment already being involved in a call. Hence, in preferred embodiments all of the radio port managers associated with radio slots that can be used to contact the addressed subscriber terminal are arranged to send the invitation message, this ensuring that the subscriber terminal 20 will receive the invitation message and act appropriately.

The invitation messages transmitted by the radio port managers 150 are received by a radio port slave 160 within the subscriber terminal 20. Generally, there will be one radio port slave 160 per subscriber terminal 20. The radio port slave 160 will then inform the ST logic 170 that a request to acquire a particular radio slot has been received. The ST logic 170 in FIG. 5 encapsulates the functionality contained in the ST's microcontroller. The ST logic 170 will then return an access request message to the radio port slave 160 instructing the radio port slave to issue an acquisition request message to the radio port manager 150 within the central terminal 10 associated with the identified radio slot. Once this has been done, the radio port slave 160 will enter a state in which it waits to be granted access to the wireless link.

Once the radio port manager 150 associated with the allocated radio slot has received the acquisition request message, it checks that the acquisition request message has been received from the correct subscriber terminal 20, and then determines whether the subscriber terminal is using the required bandwidth for the call. Generally, during this first communication from the subscriber terminal, the subscriber terminal will be configured to use a low rate, preferably 10 Kbit/s, signal, which will typically be less than the transmission rate required to handle the data traffic of the incoming call. Hence, the radio port manager 150, in such situations, will issue a rate switch message back to the radio port slave to cause the radio port slave to reconfigure the subscriber terminals to use the required bandwidth, the radio port slave 160 then reissuing the acquisition request message to the radio port manager 150. For the sake of clarity, this communication between the radio port manager and the radio port slave to set the correct transmission rate is not illustrated in FIG. 5.

Once the correct transmission rate has been established, the radio port manager will send a message to the radio port slave 160 granting the subscriber terminal access to the radio slot, and will also send an acquisition acknowledge message via the radio slave 140 and the radio manager 130, to the call manager 120.

At this point, the call manager 120 will instruct the bearer manager 180 to allocate bearer time slots on the links of the concentrated interface between the access concentrator 100 and the central terminal 10.

Once this has been done, the call manager 120 then sends a set up request via the radio port manager to the radio port slave 160 of the subscriber terminal 20. The radio port slave 160 then informs the ST logic 170 of the incoming call, and this will cause the appropriate item of telecommunications equipment to ring. When an off hook condition is detected by the ST logic 170, it instructs the radio port slave 160 to send a signal via the radio port manager 150 to the call manager 120 to confirm that it is ready to receive the incoming call data. The call manager then contacts the exchange port 110 to confirm that the ST is ready to receive the incoming call, and a "call connected" message is then returned from the exchange port 110 via the call manager 120 and the radio port manager 150 to the radio port slave 160. At this point the incoming call has been connected, and the call can then proceed.

Figure 6:
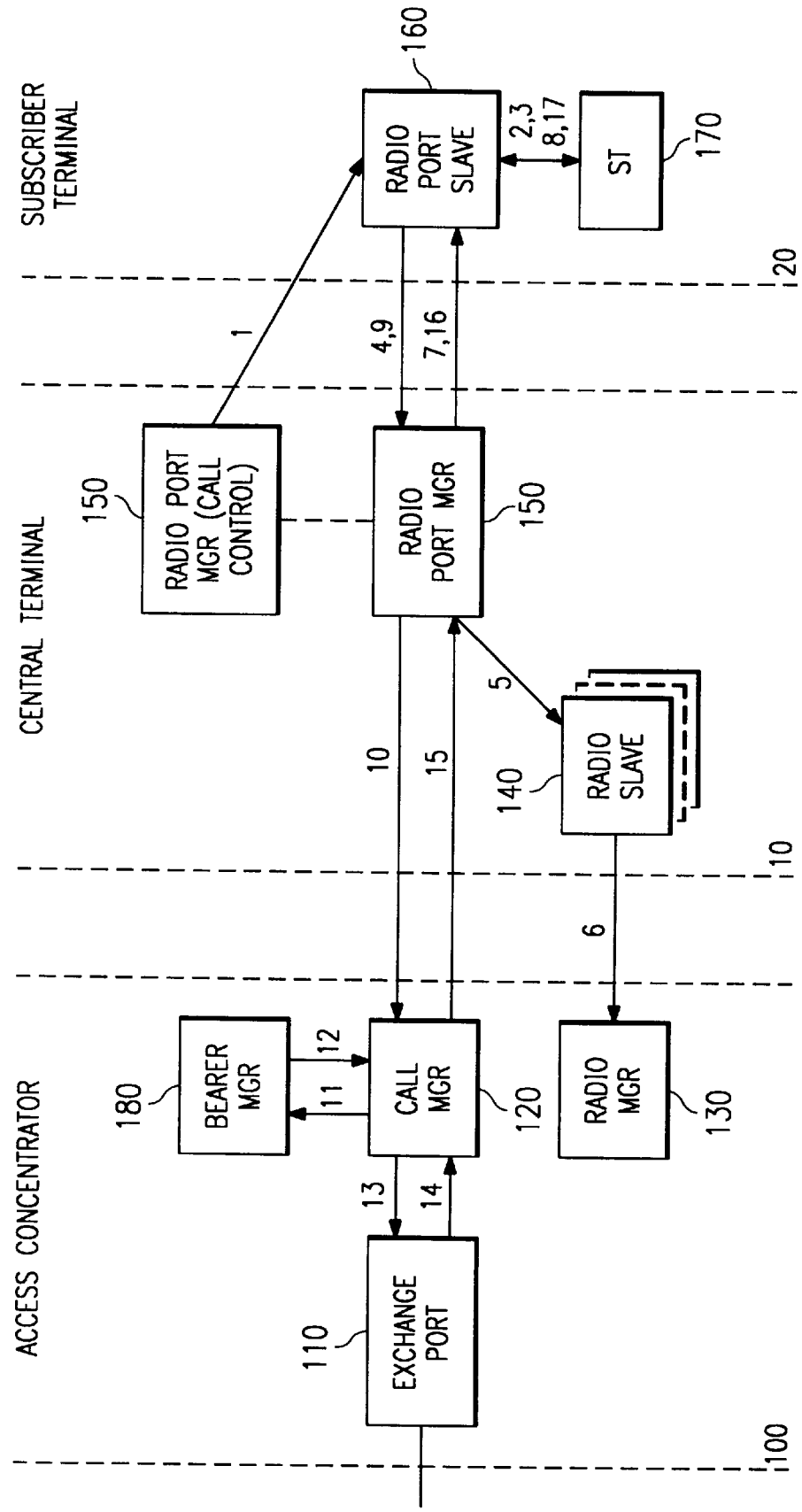
FIG. 6 is a block diagram illustrating the main elements employed in preferred embodiments of the present invention to handle an outgoing call from a subscriber terminal.

FIG. 6 is a similar diagram to FIG. 5, but with the arrows, and associated numerals, indicating the sequence of events involved in establishing an outgoing call from the subscriber terminal to the switch. Periodically the radio port manager 150 associated with the call control channel is arranged to broadcast a free list to subscriber terminals 20 indicating those radio slots which are available for acquisition by the subscriber terminals for outgoing calls. The radio port managers 150 associated with the radio slots identified in the free list are notified, so that they can configure themselves to be in an available state, in which they are ready to receive acquisition request messages from subscriber terminals. When the radio port slave 160 receives the free list broadcast on the call control channel it notifies the subscriber terminal logic 170.

If the subscriber terminal logic 170 then detects an off hook condition, indicating that a user of a connected item of telecommunications equipment wishes to make an outgoing call, then the subscriber terminal logic 170 will inform the radio port slave 160 of a radio slot that it has selected from the free list, and which is to be used to establish the outgoing call.

The radio port slave 160 will then notify the radio port manager 150 associated with the selected radio slot by issuing an acquisition request message to the radio port manager. The acquisition request message identifies the ST wishing to make the outgoing call. As discussed earlier, the CT knows what bandwidth can be supported by any particular ST, and hence can determine how many radio slots need to be allocated. Thus, the radio port manager 150 will then inform the radio manager 130 via the radio slave 140 of the acquisition of the radio slot(s) by the subscriber terminal 20. This information will then subsequently be used by the radio manager 130 and/or radio slaves 140 when constructing the next free list to be broadcast on the call control channel. This ensures that the free list broadcast on the call control channel is always kept up to date. Further, as in the incoming call case, the radio port manager will determine the transmission rate required for the call, and will send a rate switch message to the radio port slave 160 if the transmission rate needs to be altered. Upon establishment of the correct transmission rate, the radio port manager 150 will issue an access grant message to the radio port slave 160.

The ST logic 170 then sends the off hook message to the radio port slave 160, which passes it on to the call manager 120 via the radio port manager 150. As with the incoming call case, the call manager 120 then contacts the bearer manager 180 in order to instruct the bearer manager 180 to allocate a bearer channel to carry the call between the Access Concentrator 100 and the central terminal 10.

The call manager 120 then sends a set up command to the exchange port 110, and upon receipt of a set up response from the exchange port 110, returns a set up confirmation message to the radio port slave 160 via the radio port manager 150. This message is then passed to the subscriber terminal logic 170, at which point the outgoing call can take place.

Having described the process involved in routing a call between the switch and the subscriber terminal in both an incoming and an outgoing call situation, the specific process performed by the radio port managers and the radio port slaves in accordance with preferred embodiments of the present invention will now be discussed in detail with reference to FIGS. 7 and 8, which are interaction diagrams showing the exchange of function calls and messages between the radio port managers of the central terminal and the radio port slave of a subscriber terminal.

Figure 7:
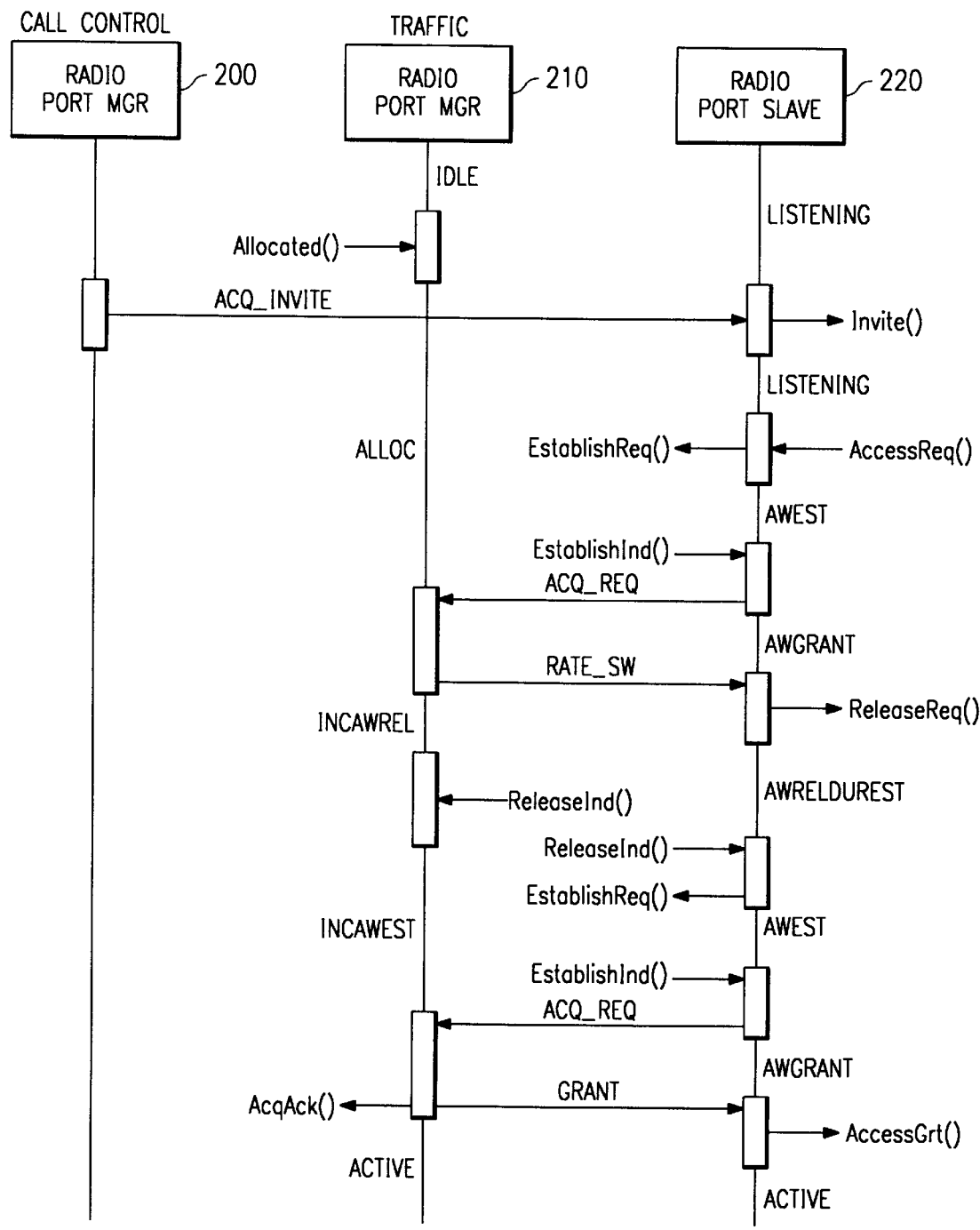
FIG. 7 is an interaction diagram illustrating the communications between the radio port managers of the central terminal and the radio port slave of a subscriber terminal during the establishment of an incoming call.

FIG. 7 is an interaction diagram showing the function calls and messages passed between the radio port managers and the radio port slave during the establishment of an incoming call. The diagram shows the radio port manager 200 associated with the call control channel, and the radio port manager 210 associated with the radio slot to be used for the incoming call. Further, FIG. 7 shows the radio port slave 220 of the subscriber terminal to which the incoming call is directed.

The radio port manager object 210 is initially in an "IDLE" state until it receives the "Allocated" function call from the appropriate radio slave 140. This function call informs the radio port manager 200 that a particular subscriber terminal is to acquire its radio slot, and causes the radio port manager to set up the central terminal's wireless communications interface to receive an acquisition request message from that subscriber terminal.

In preferred embodiments, the communication between the central terminal and the subscriber terminal is via a three layer protocol, the radio port manager 210 and the radio port slave 220 terminating the layer three protocol used for such communications. In preferred embodiments, the layer 2 is based on the Q.921 standard, and layer 1 is a "High level Data Link Control" (HDLC) layer.

Once the communications interface has been set up, then the radio port manager 210 waits to receive the acquisition request message from the subscriber terminal's radio port slave 220. At this point the radio port manager 210 is in an "ALLOCATED" state.

Assuming the radio port slave 220 is in a "LISTENING" state, then it will be configured to listen to the call control channel. Once the radio port manager 210 has entered the "ALLOCATED" state, then the radio port manager 200 associated with the call control channel is arranged to send an invitation message, termed an "ACQ_INVITE" message in FIG. 7, to the radio port slave 220 to invite the radio port slave to acquire the wireless link on the particular radio slot associated with the radio port manager 210. This message is sent by the radio port slave 220 to logic within the subscriber terminal, the radio port slave 220 then returning to the LISTENING state. The ST logic responds to the invite message by returning an "AccessReq" function call to the radio port slave 220 instructing the radio port slave to issue an acquisition request message to the radio port manager 210. Upon receipt of this function call, the radio port slave 220 issues an "EstablishReq" function call to initiate establishment of the Layer 2 radio link. Then, it enters the "AWEST" state, during which it awaits establishment of the layer two radio link for the communications interface between the subscriber terminal and the central terminal.

When an "EstablishInd" function call is received to indicate that the radio link is established, the radio port slave 220 then issues the acquisition request message, referred to as the "ACQ_REQ" message in FIG. 7, to the radio port manager 210. The radio port slave 220 then enters the "AWGRANT" state where it waits to be granted access to the radio slot for the incoming call.

Upon receipt of the acquisition request message, the radio port manager 210 firstly determines whether the message has been received from the correct subscriber terminal, and then determines the rate required for the incoming call. In preferred embodiments, the subscriber terminal will initially have been set up for the low rate, 1 Kbit/s per second, acquisition mode, which will typically not be the required rate for the incoming call. Assuming the rate is not the required rate for the incoming call, then the radio port manager 210 is arranged to send a rate switch message, referred to as the "RATE_SW" message in FIG. 7, to the radio port slave 220. The radio port manager 210 then enters the "INCAWREL" state in which it awaits a "ReleaseInd" function call to indicate that the layer two radio link has been dropped, the presence of this function call indicating that the rate switch message has been received by the radio port slave 220. This is so because the radio port slave 220 is arranged, upon receipt of the rate switch message, to issue a "ReleaseReq" function call to drop the layer two radio link.

Once the radio port manager 210 has received the "ReleaseInd" function call, the communications interface within the central terminal is configured for the new transmission rate. Additionally, the layer two radio link of the central terminal communication interface is dropped, this resulting in a "ReleaseInd" function call being received by the radio port slave 220. Prior to the receipt of this function call, the radio port slave 220 is in a "AWRELDUREST" state where it is awaiting release of the radio link during the establishment process.

Upon receipt of the function call, the radio port slave 220 configures the communications interface within the subscriber terminal for the new transmission rate, and sends off an "EstablishReq" function call, before entering an "AWEST" state in which it awaits establishment of the layer two radio link. The establishment of this layer two radio link is indicated by the receipt at the radio port slave 220 of an "EstablishInd" function call, upon receipt of which the radio port slave 220 reissues the acquisition request message at the new rate to the radio port manager 210 and enters the "AWGRANT" state.

Prior to receipt of the acquisition request message, the radio port manager 210 is in the "INCAWEST" state awaiting establishment of the layer 2 radio link. Upon receipt of the acquisition request message, the radio port manager 210 again checks whether the correct rate is being used, and if not, the above described process of issuing a rate switch message, and reconfiguring the communication interfaces for the new rate, takes place. However, assuming the correct rate is being used, then the radio port manager 210 sends a "GRANT" message to the radio port slave 220, at which point the radio port slave 220 changes from the "AWGRANT" state to the "ACTIVE" state, and issues an "AccessGrant" function call to the subscriber terminal logic. Further, in addition to issuing the "GRANT" message, the radio port manager 210 also issues an acquisition acknowledge (AcqAck) function call to the radio slave, prior to entering the "ACTIVE" state. At this point, both the radio port manager 210 and the radio port slave 220 are configured to handle the incoming call.

Figure 8:
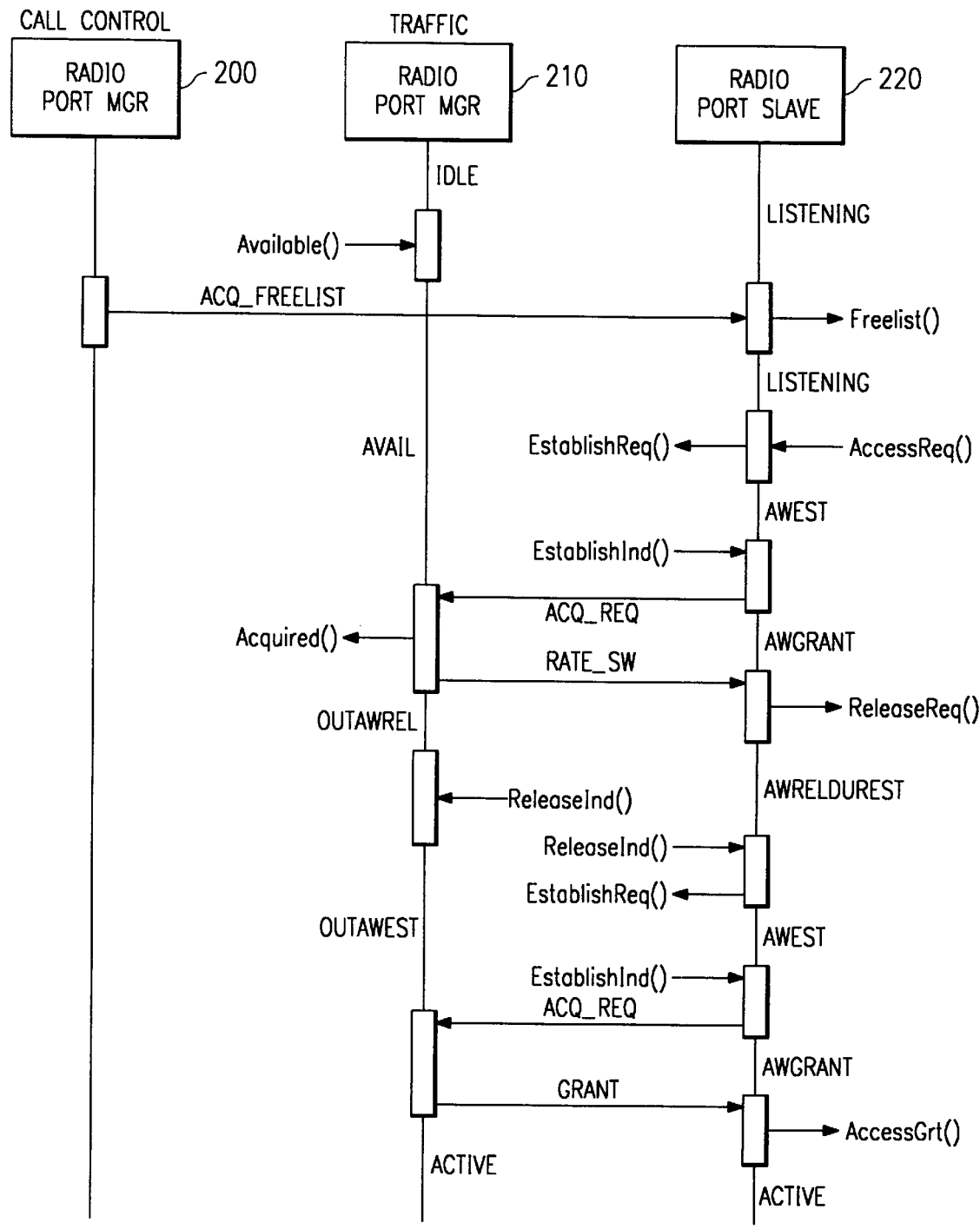
FIG. 8 is an interaction diagram illustrating the communications between the radio port managers of the central terminal and the radio port slave of a subscriber terminal during the establishment of an outgoing call.

FIG. 8 illustrates a similar interaction diagram, but this time indicates the function calls and messages employed for outgoing calls. The radio port manager 210 associated with one of the radio slots identified in the free list to be broadcast to the subscriber terminals is initially in the "IDLE" state, prior to the receipt of an "Available" function call from the radio slave. At this point, the radio port manager 210 configures the central terminal's communications interface for the low acquisition rate, and then enters the "AVAIL" state.

When the radio port slave 220 is in the "LISTENING" state, it will periodically receive via the call control channel a free list contained in a "ACQ_FREELIST" message transmitted by the radio port manager 200. The radio port slave 220 then generates a "Freelist" function call to logic within the subscriber terminal identifying the free radio slots that may be used for outgoing calls, before returning to the LISTENING state.

When an outgoing call is to take place, an access request function call is sent from the subscriber terminal logic to the radio port slave 220, instructing the radio port slave 220 to issue an acquisition request message to a particular radio port manager 210 associated with the radio slot that has been selected from the free list. The radio port slave then issues an "EstablishReq" function call to initiate establishment of the Layer 2 radio link, before entering the "AWEST" state whilst it waits for the Layer 2 radio link to be established. Once an "EstablishInd" function call has been received to indicate that the link has been established, the radio port slave 220 issues the acquisition request message to the radio port manager 210 and enters the "AWGRANT" state.

Upon receipt of the acquisition request message, the radio port manager 210 sends an "Acquired" function call to the radio slave to indicate that the radio slot or radio slots is/are no longer available and should no longer be broadcast in the free list, the CT knowing the bandwidth that can be supported by the ST, and hence how many radio slots are to be allocated. At this point, an analogous process is performed to that for incoming calls, in order to determine the correct rate to be used for the call, and to grant access to the radio slot once the communications interfaces at both the central terminal and the subscriber terminal are configured to use the correct rate. Once this has been done, both the radio port manager 210 and the radio port slave 220 enter the "ACTIVE" state, and are then configured to handle the outgoing call.

Having described the process performed by the radio port managers and the radio port slaves in accordance with preferred embodiments of the present invention, the specific process performed by the radio manager and the radio slaves in preferred embodiments will now be discussed in detail with reference to FIGS. 9 to 11, which are interaction diagrams showing the exchange of function calls and messages between the radio manager, a transaction state machine established by the radio manager, and a radio slave of the central terminal.

Figure 9:
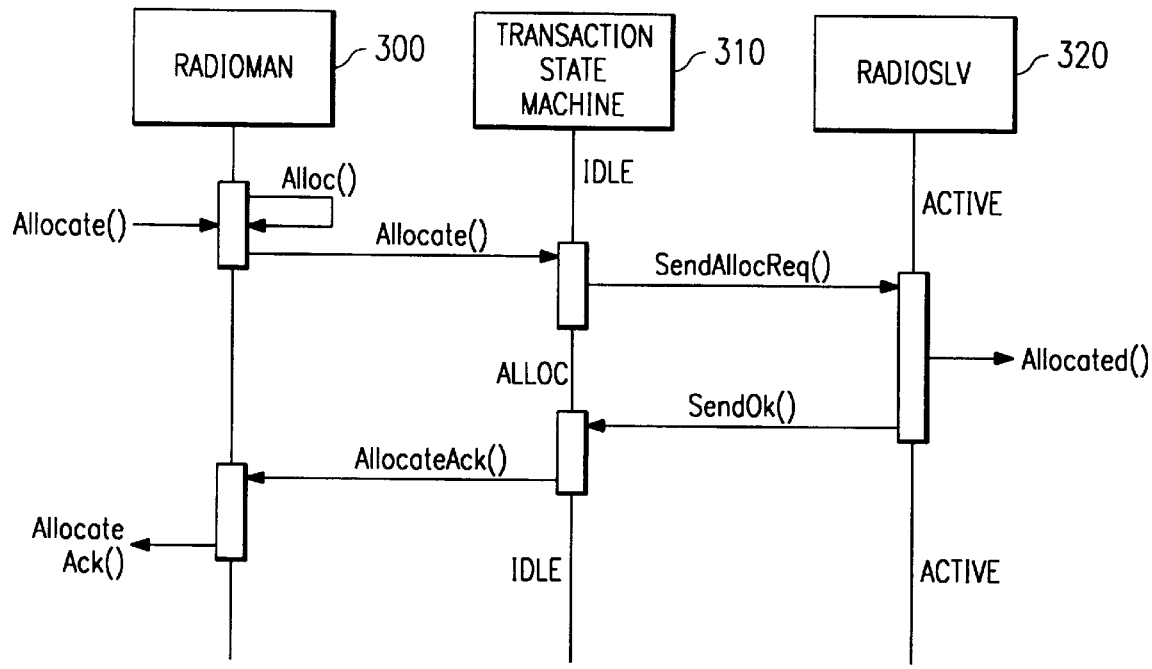
FIG. 9 is an interaction diagram illustrating the communications between the radio manager and radio slaves during the successful allocation of a radio slot to an incoming call.

FIG. 9 is an interaction diagram showing the function calls and messages passed between the radio manager, a transaction state machine and the radio slave during the successful allocation of a radio slot to an incoming call. The diagram shows the radio manager 300, a transaction state machine 310 allocated by the radio manager 300 to obtain one or more radio slots for an incoming call, and a radio slave 320 to which the request for allocation of radio slots is directed.

When an incoming call is received, the call manager 120 is arranged to issue an "Allocate" function call to the radio manager 300, instructing the radio manager to allocate a radio slot for the incoming call. Upon receipt of this function call, the radio manager 300 performs an "Alloc" function in order to allocate a transaction state machine 310 to handle the radio slot allocation process for the particular incoming call. Once the transaction state machine 310 has been allocated, the radio manager 300 sends an "Allocate" function call to that transaction state machine 310.

Prior to the receipt of the "Allocate" function call, the transaction state machine 310 will be in an "IDLE" state. However, upon receipt of the "Allocate" function call, the transaction state machine 310 is arranged to select a modem shelf corresponding to a frequency channel that may be used to communicate with the addressed ST, and then to issue a "SendAllocReq" function call to the radio slave 320 of the selected modem shelf. This "SendAllocReq" function call will include information about the bandwidth required for the call, and hence the number of radio slots, this information having been determined based on information accessible by the radio manager 300 identifying the bandwidth required by the addressed ST, and included within the "Allocate" function call sent to the transaction state machine.

Prior to receipt of the "SendAllocReq" function call, the radio slave 320 will be in the "ACTIVE" state. Upon receipt of the function call, the radio slave 320 is arranged to reference a local record maintained by the radio slave, identifying the status of the radio slots within the frequency channel managed by that radio slave, in order to determine whether the required number of radio slots are available. If so, an "Allocated" function call is sent to the radio port manager associated with the radio slot (or the "primary" radio slot if more than one radio slot is to be allocated), and then a "SendOk" function call is issued to the transaction state machine 310. The radio slave 320 then enters the "ACTIVE" state.

Prior to receipt of the "SendOk" function call, the transaction state machine 310 will be in the "ALLOC" state.

Upon receipt of the "SendOk" function call, the transaction state machine 310 is arranged to return an "AllocateAck" function call to the radio manager 300, which then updates its local record of allocated slots. The "AllocateAck" function call is then sent from the radio manager 300 to the call manager to inform the call manager that the required number of radio slots have been allocated to the incoming call.

Figure 10:
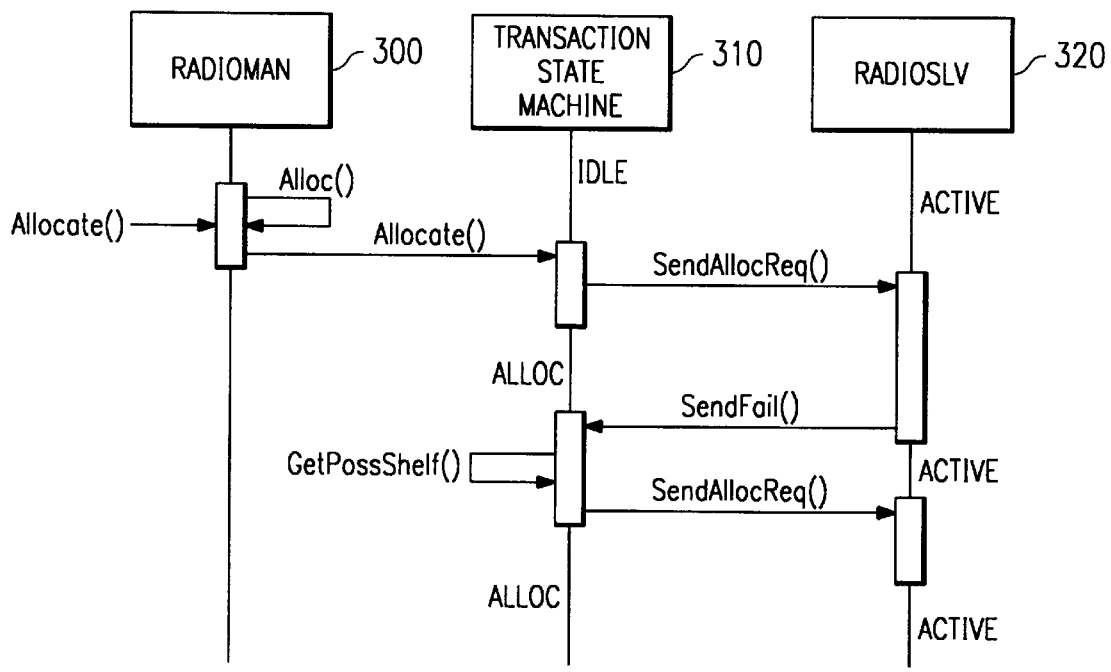
FIG. 10 is an interaction diagram illustrating the communications between the radio manager and radio slaves during failure to allocate a radio slot to an incoming call.

FIG. 10 is an interaction diagram showing the sequence of events that occur if the request to a particular radio slave to allocate a radio slot fails. Initially the process is the same as that described earlier with reference to FIG. 9, and hence a selected radio slave 320 will receive the "SendAllocReq" function call from the transaction state machine 310. However, if the radio slave 320 is not able to allocate the required number of radio slots, because for example all of the radio slots on that frequency channel are already in use, then it is arranged to send a "SendFail" function call to the transaction state machine 310.

Upon receipt of the "SendFail" function call, the transaction state machine 310 is arranged to issue a "GetPossShelf" function call which results in another modem shelf being identified from the database record for the addressed subscriber terminal, this modem shelf operating on a frequency channel that can be used to contact the addressed subscriber terminal. The details of this other modem shelf are returned to the transaction state machine 310, which then issues a "SendAllocReq" function call to the radio slave 320 associated with that modem shelf. It will be appreciated that this radio slave 320 is a different radio slave to the one that received the previous "SendAllocReq" function call. Upon receipt of the "SendAllocReq" function call, the radio slave 320 will determine whether it can provide the required number of radio slots from its frequency channel. If it can, then the process proceeds as shown in FIG. 9, starting with the transmission of an "Allocated" function call to the radio port manager associated with the allocated radio slot. If, however, the radio slave 320 cannot allocate the required number of radio slots, then it issues a "SendFail" function call to the transaction state machine 310 and the process illustrated in FIG. 10 is then repeated.

If, for any reason, none of the modem shelves within the CT can support the required number of radio slots to enable the call to be established with the addressed subscriber terminal, and hence all of the radio slaves 320 issue a "SendFail" function call, then the transaction state machine 310 is arranged to issue an "AllocateFail" function call to the radio manager 300, which then passes this function call back to the call manager to indicate that the incoming call cannot be established. In this scenario, an engaged tone will typically be passed back through the PSTN to the user originating the call.

Assuming the required number of radio slots can be allocated by one of the radio slaves 320, then the call manager is arranged to issue an "InviteAcq" function call to the radio manager 300 instructing the radio manager to issue an invitation to acquire the radio slot to the addressed subscriber terminal. For reasons discussed earlier with reference to FIG. 5, the radio manager is arranged to inform all of the radio slaves associated with frequency channels that may be used to contact the subscriber terminal, and these radio slaves are arranged to instruct all of the radio port managers associated with the radio slots of those frequency channels so as to cause those radio port managers to transmit an invitation message to the addressed subscriber terminal. This process is illustrated in FIG. 11.

Figure 11:
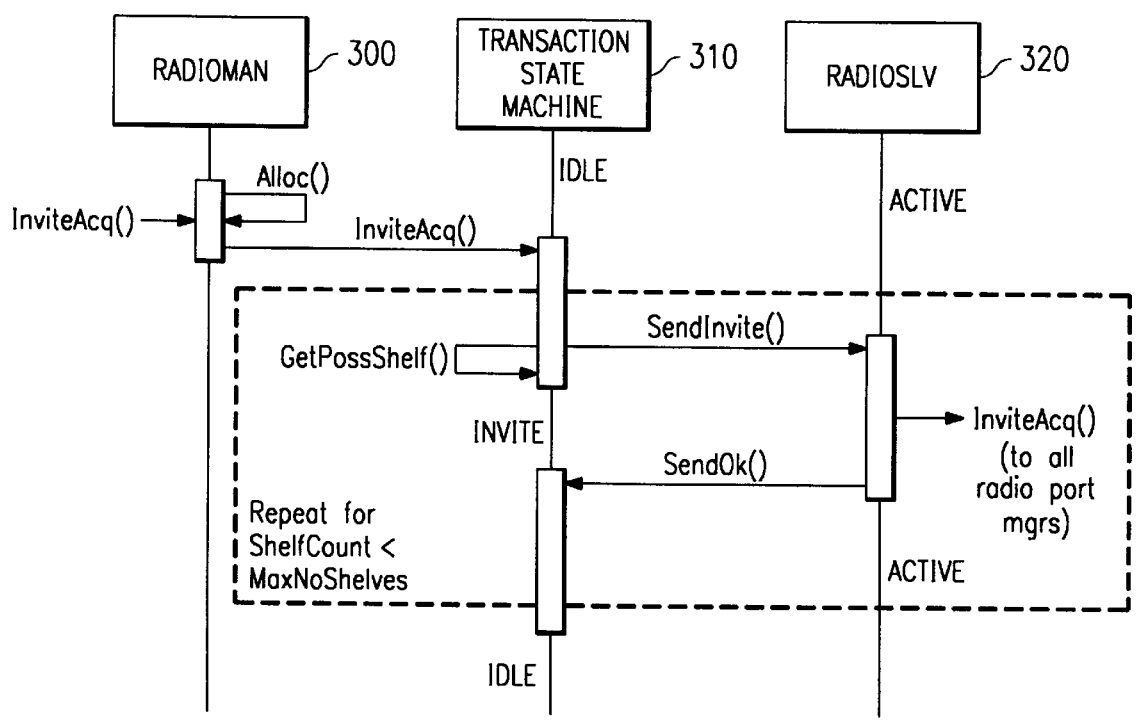
FIG. 11 is an interaction diagram illustrating the communications between the radio manager and radio slaves to cause an invitation message to be sent to a subscriber terminal addressed by an incoming call.

As illustrated in FIG. 11, upon receipt of the "InviteAcq" function call from the call manager, the radio manager 300 is arranged to perform an "Alloc" function call in order to allocate a transaction state machine 310 to handle the invitation to acquire process. When a transaction state machine 310 has been allocated, the radio manager 300 issues the "InviteAcq" function call to that transaction state machine 310, which then issues a "GetPossShelf" function call in order to determine from the database record for the addressed ST a modem shelf that may be used to communicate with that ST.

Once such a modem shelf has been identified to the transaction state machine 310, the transaction state machine then issues a "SendInvite" function call to the radio slave 320 associated with that modem shelf. Upon receiving the "SendInvite" function call, the radio slave 320 is arranged to issue the "InviteAcq" function call to all of the radio port managers associated with radio slots that may be used to contact the addressed subscriber terminal on that frequency channel, so as to cause those radio port managers to issue an "ACK_INVITE" message to the addressed subscriber terminal. The radio slave 320 then issues a "SendOk" function call back to the transaction state machine 310 to indicate that all of the radio port managers have been notified.

Prior to receiving the "SendOk" function call, the transaction state machine 310 is in an "INVITE" state. Upon receipt of the "SendOk" function call, the process loops back to the process performed upon receipt of the "InviteAcq" function call, resulting in another modem shelf being identified, and the "SendInvite" function call being issued to the radio slave associated with that modem shelf. By this approach, each modem shelf is addressed in turn, until all of the modem shelves capable of communicating with the addressed subscriber terminal have been contacted, and the radio port managers associated with radio slots within the frequency channel used by those modem shelves have issued the invitation message to the addressed subscriber terminal. When this process has been completed, the transaction state machine 310 frees itself so that it can be allocated for further tasks by the radio manager 300, and then returns to the "IDLE" state.

As an alternative to implementing a loop process within the transaction state machine in order to ensure that each modem shelf is addressed in turn, the radio manager 300 can be arranged to allocate a separate transaction state machine 310 for each modem shelf to be addressed. The process illustrated in FIG. 11 is then performed only once by each transaction state machine 310.

It should be noted that the radio manager 300 can handle a number of calls simultaneously because, for each call, a separate transaction state machine 310 is preferably allocated to handle the radio slot allocation, or invitation to acquire, process.

For outgoing calls, the radio manager is notified by the radio port managers, via the radio slaves, of the acquisition of radio slots by STs. If a global free list is to be transmitted to the STs containing information about the free slots on all of the frequency channels being used by the CT's modem shelves, then this information can be used by the radio manager to update this global free list. However, if a free list is to be broadcast for each modem shelf, then the corresponding radio slaves are preferably used to construct the freelists. However, other than this, in preferred embodiments the radio manager and radio slaves take no active part in the radio slot allocation process for outgoing calls.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A wireless telecommunications system comprising an interface mechanism for allocating a radio slot for a wireless link between a central terminal and a subscriber terminal within said wireless telecommunications system, one or more frequency channels being provided to support wireless links between the central terminal and the subscriber terminal, and being arranged to provide a plurality of radio slots, the interface mechanism comprising:

a radio manager, responsive to an indication that a call is to be established, for issuing an allocation request message to a radio slave within the central terminal requesting that radio slave to allocate a radio slot for the call; and a radio slave, within the central terminal and associated with each frequency channel, for managing the allocation of radio slots within that frequency channel and arranged to be responsive to receipt of the allocation request message from the radio manager, to reference a record identifying available radio slots within the frequency channel in order to select, if available, a radio slot within that frequency channel for allocation to the call, to issue a response message to the radio manager indicating that a radio slot has been selected, and to update its record of available radio slots accordingly.

2. A wireless telecommunications system as claimed in claim 1, wherein the radio manager is arranged to respond to an indication that the radio slave addressed by the allocation request message does not have a radio slot available for the call, to re-issue the allocation request message to another of said radio slaves.

3. A wireless telecommunications system as claimed in claim 1, wherein the indication that a call is to be established is generated by a call manager arranged to receive an incoming call destined for said subscriber terminal.

4. A wireless telecommunications system as claimed in claim 3, wherein the radio manager notifies the call manager when a radio slot has been allocated.

5. A wireless telecommunications system as claimed in claim 1, wherein, if more than one radio slot is to be used for communications with the subscriber terminal, the allocation request message identifies the number of radio slots required, and the radio slave is arranged to select, if available, that number of radio slots and to issue a response message to the radio manager indicating that the required number of radio slots have been selected.

6. A wireless telecommunications system as claimed in claim 1, wherein the radio manager comprises a transaction state machine allocated by the radio manager to send the allocation request message to the radio slave, and to receive the response message from the radio slave.

7. A wireless telecommunications system as claimed in claim 1, wherein, upon receipt of the response message, the radio manager is arranged to cause an invitation message to be transmitted to the subscriber terminal inviting the subscriber terminal to acquire the wireless link on the selected radio slot.

8. A wireless telecommunications system as claimed in claim 7, wherein the radio manager is arranged to instruct the radio slave to cause the invitation message to be transmitted to the subscriber terminal.

9. A wireless telecommunications system as claimed in claim 7, further comprising:

a call control channel provided within the frequency channel;

a radio port manager associated with the call control channel; and the radio manager being arranged to instruct that radio port manager via the radio slave to transmit the invitation message to the subscriber terminal over the call control channel.

10. A wireless telecommunications system as claimed in claim 9, wherein each radio slot has a radio port manager associated therewith, and, for incoming calls to the subscriber terminal, the radio manager is arranged to instruct the radio slave to cause the invitation message to be transmitted by all radio port managers capable of communicating with the subscriber terminal.

11. A wireless telecommunications system as claimed in claim 10, wherein the radio slave is arranged to notify the radio manager when all radio port managers have been instructed to send the invitation message.

12. A wireless telecommunications system as claimed in claim 7, wherein the radio manager comprises a transaction state machine allocated by the radio manager to cause the invitation message to be transmitted to the subscriber terminal via the radio slave, and to receive any confirmation signals from the radio slave.

13. A wireless telecommunications system as claimed in claim 12, wherein a radio slave is provided for each frequency channel and, if more than one frequency channel may be used to communicate with the subscriber terminal, the transaction state machine is arranged to instruct each radio slave in turn to cause the invitation message to be transmitted to the subscriber terminal.

14. A wireless telecommunications system as claimed in claim 7, further comprising a radio port slave within the subscriber terminal for receiving the invitation message, and for issuing an acquisition request message to a radio port manager within the central terminal associated with the selected radio slot, the radio port manager being responsive to receiving the acquisition request message to grant the subscriber terminal access to the radio slot.

15. A wireless telecommunications system as claimed in claim 14, wherein said radio slave, upon selecting a radio slot, is arranged to inform the radio port manager within the central terminal associated with that selected radio slot to cause that radio port manager to configure the central terminal to receive the acquisition request message on that selected radio slot.

16. A wireless telecommunications system as claimed in claim 14, wherein:

the radio port manager is arranged to determine a transmission rate required by the subscriber terminal for said wireless link, and, upon receipt of the acquisition request message from the radio port slave, to issue a rate switch message to the radio port slave if the radio port slave is not using the required transmission rate;

the radio port slave being responsive to the rate switch message to configure the subscriber terminal to use the required transmission rate and to re-issue the acquisition request message to the radio port manager.

17. A wireless telecommunications system as claimed in claim 1, wherein the radio slave is arranged to cause a list to be broadcast on a call control channel provided within the frequency channel, the list identifying available radio slots that may be used to establish an outgoing call from the subscriber terminal, the subscriber terminal, upon selecting one of these available radio slots, being arranged to issue an acquisition request message to a radio port manager within the central terminal associated with the selected radio slot.

18. A wireless telecommunications system as claimed in claim 17, wherein the radio slave is arranged to inform those radio port managers associated with the available radio slots identified in the list, to cause those radio port managers to enter an available state in which they can receive an acquisition request message.

19. A wireless telecommunications system as claimed in claim 18, wherein the radio port manager associated with the radio slot selected by the subscriber terminal is arranged to notify the radio slave of the acquisition of that radio slot upon receipt of the acquisition request message from the radio port slave.

20. A radio manager for allocating a radio slot for a wireless link between a central terminal and a subscriber terminal within said wireless telecommunications system, at least one frequency channel being provided to support wireless links between the central terminal and the subscriber terminal, and a frequency channel being arranged to provide a plurality of radio slots, the radio manager being configured to be operable to receive an indication that a call is to be established, to issue an allocation request message to a radio slave within the central terminal requesting that radio slave to allocate a radio slot for the call, and to receive a response message from the radio slave indicating that a radio slot has been selected, wherein, if an indication is received that the radio slave addressed by the allocation request message does not have a radio slot available for the call, the radio manager is configured to be operable to re-issue the allocation request message to another radio slave associated with another frequency channel.

21. A radio manager as claimed in claim 20, wherein the other radio slave is associated with another frequency channel.

22. A radio manager as claimed in claim 20, comprising a transaction state machine allocated by the radio manager to send the allocation request message to the radio slave, and to receive the response message from the radio slave.

23. A radio manager as claimed in claim 20, wherein, upon receipt of the response message, the radio manager is configured to be operable to cause an invitation message to be transmitted to the subscriber terminal inviting the subscriber terminal to acquire the wireless link on the selected radio slot.

24. A radio manager as claimed in claim 23, wherein the radio manager is arranged to instruct the radio slave to cause the invitation message to be transmitted to the subscriber terminal.

25. A radio slave for managing a frequency channel associated with the radio slave and provided to support a wireless link between a central terminal and a subscriber terminal within said wireless telecommunications system, the frequency channel being arranged to provide a plurality of radio slots, the radio slave being configured to be operable to maintain a record identifying the status of radio slots within the associated radio frequency, to receive an allocation request message requesting the radio slave to allocate a radio slot for a call, to reference the record identifying available radio slots within the frequency channel in order to select, if available, a radio slot for allocation to the call, to issue a response message indicating that a radio slot has been selected, and to update its record of available radio slots accordingly.

26. A radio slave as claimed in claim 25, wherein, if more than one radio slot is to be used for communications with the subscriber terminal, the allocation request message identifies the number of radio slots required, and the radio slave is arranged to select, if available, that number of radio slots and to issue a response message indicating that the required number of radio slots have been selected.

27. A method of allocating a radio slot for a wireless link between a central terminal and a subscriber terminal of a wireless telecommunications system, at least one frequency channel being provided to support wireless links between the central terminal and the subscriber terminal, and a frequency channel being arranged to provide a plurality of radio slots, the method comprising the steps of:

employing a radio manager to respond to an indication that a call is to be established by issuing an allocation request message to a radio slave within the central terminal requesting that radio slave to allocate a radio slot for the call;

employing a radio slave, within the central terminal and associated with a frequency channel, for managing the allocation of radio slots within that frequency channel, to respond to receipt of the allocation request message from the radio manager by referencing a record identifying available radio slots within the frequency channel in order to select, if available, a radio slot within that frequency channel for allocation to the call;

issuing a response message to the radio manager indicating that a radio slot has been selected; and updating the record of available radio slots accordingly.

28. A method as claimed in claim 27, wherein a radio slave is provided for each frequency channel arranged to support wireless links between the central terminal and the subscriber terminal, and the method further comprises the step of, responsive to an indication that the radio slave addressed by the allocation request message does not have a radio slot available for the call, employing the radio manager to re-issue the allocation request message to another of said radio slaves.

29. A method as claimed in claim 27, wherein, if more than one radio slot is to be used for communications with the subscriber terminal, the method further comprises the steps of:

including within the allocation request message an indication of the number of radio slots required;

employing the radio slave to select, if available, that number of radio slots; and issuing a response message to the radio manager indicating that the required number of radio slots have been selected.

30. A method as claimed in claim 27, further comprising the step of, upon receipt of the response message, employing the radio manager to cause an invitation message to be transmitted to the subscriber terminal inviting the subscriber terminal to acquire the wireless link on the selected radio slot.

31. A method as claimed in claim 30, further comprising the step of instructing the radio slave to cause the invitation message to be transmitted to the subscriber terminal.

32. A method as claimed in claim 30, wherein a call control channel is provided within the frequency channel, and a radio port manager is associated with the call control channel, the method further comprising the step of instructing that radio port manager via the radio slave to transmit the invitation message to the subscriber terminal over the call control channel.

33. A method as claimed in claim 32, wherein each radio slot has a radio port manager associated therewith, and, for incoming calls to the subscriber terminal, the method further comprises the step of instructing the radio slave to cause the invitation message to be transmitted by all radio port managers capable of communicating with the subscriber terminal.

34. A method as claimed in claim 33, further comprising the step of notifying the radio manager when all radio port managers have been instructed to send the invitation message.

35. A method as claimed in claim 30, wherein a radio slave is provided for each frequency channel and, if more than one frequency channel may be used to communicate with the subscriber terminal, the method further comprises the step of instructing each radio slave in turn to cause the invitation message to be transmitted to the subscriber terminal.

* * * * *